United States Patent

Hejazi

[11] Patent Number: 5,324,957
[45] Date of Patent: Jun. 28, 1994

[54] BELT POSITION SENSOR

[75] Inventor: Shahram Hejazi, Webster, N.Y.

[73] Assignee: Eastman Kodak Company, Rochester, N.Y.

[21] Appl. No.: 85,854

[22] Filed: Jun. 30, 1993

[51] Int. Cl.⁵ .............. G01N 23/04; G03B 42/02; B65G 15/00

[52] U.S. Cl. .............. 250/589; 250/223 R; 250/590; 198/807; 198/810

[58] Field of Search .......... 250/589, 590, 341; 198/810, 807

[56] References Cited

U.S. PATENT DOCUMENTS

| Re. 32,001 | 10/1985 | Wahle . | |
|---|---|---|---|
| 3,591,018 | 7/1971 | Nalbach . | |
| 3,913,729 | 10/1975 | Andrews | 198/807 |
| 3,944,046 | 3/1976 | Kubicek . | |
| 4,053,234 | 10/1977 | McFarlane . | |
| 4,217,530 | 8/1980 | Dahm . | |
| 4,425,042 | 1/1984 | Smith . | |
| 4,456,239 | 6/1984 | Yamaguchi . | |
| 4,527,686 | 7/1985 | Satoh | 198/807 |
| 4,595,294 | 6/1986 | Ohki et al. . | |
| 4,680,806 | 7/1987 | Bolza-Schünemann . | |
| 4,723,074 | 2/1988 | Kimura . | |
| 4,806,773 | 2/1989 | Hiraga et al. . | |
| 4,839,526 | 6/1989 | Pryor . | |
| 4,874,939 | 10/1989 | Nishimoto et al. . | |
| 4,893,011 | 1/1990 | Bauer et al. . | |
| 4,908,514 | 3/1990 | Bauer et al. . | |
| 5,013,927 | 5/1991 | Tsikos et al. . | |
| 5,099,119 | 3/1992 | Horikawa | 250/589 |

FOREIGN PATENT DOCUMENTS

| 62-183448 | 8/1987 | Japan | 250/589 |
|---|---|---|---|
| 62-183447 | 11/1987 | Japan | 250/589 |
| 2-278252 | 11/1990 | Japan . | |
| 4-32829 | 4/1992 | Japan . | |
| 4-42221 | 12/1992 | Japan . | |
| 4-42222 | 12/1992 | Japan . | |

*Primary Examiner*—Paul M. Dzierzynski
*Assistant Examiner*—Drew A. Dunn
*Attorney, Agent, or Firm*—William F. Noval

[57] ABSTRACT

A storage phosphor system includes a storage phosphor cassette autoloader for use with a plurality of cassettes. The autoloader includes first and second endless conveyor belts, which are spaced apart and which have a plurality of outwardly extending shelves in vertical alignment so as to define a cassette read site and a plurality of cassette retaining sites. A drive drives the conveyor belts in unison to transfer cassettes loaded in the retaining sites serially through the read site. A belt position sensor senses the position of at least one of the conveyor belts and produces a signal representative of conveyor belt displacement.

4 Claims, 5 Drawing Sheets

BELT POSITION SENSOR

FIELD OF THE INVENTION

The present invention relates, in general, to equipment used in processing storage phosphors and more particularly relates to an autoloader for positioning cassettes relative to a storage phosphor reader and to a belt position control therefor.

BACKGROUND OF THE INVENTION

It is convenient to handle a storage phosphor within cassettes that protect the storage phosphor from extraneous light and damage. This is particularly the case for storage phosphors in which the latent x-ray image stored in the storage phosphor is read by photo electrically detecting an emitted x-ray image formed by scanning the storage phosphor with stimulating radiation. An example of such a storage phosphor reader is disclosed in U.S. patent application Ser. No. 979,970, filed Nov. 23, 1992 commonly assigned, inventors Rogers and Dhurjaty. It is desirable to retain the storage phosphor within a cassette except during actual processing. Such a storage phosphor cassette is disclosed in U.S. patent application Ser. No. 800,799, filed Nov. 27, 1991, now U.S. Pat. No. 5,276,333 entitled "X-RAY CASSETTE HAVING REMOVABLE PHOTOGRAPHIC ELEMENT" by Jeffrey C. Robertson, which is incorporated herein by reference. A hooked extractor can be used with the storage phosphor cassette to move a storage phosphor plate to and from a storage phosphor reader for processing. It is desirable to provide an apparatus to automate the presentation of such cassettes to such an extractor so that a number of cassettes could be processed in succession without attention from an operator. It is also desirable that such an apparatus be able to accurately position cassettes sequentially to simplify removal and reinsertion of the storage phosphor plate and that the presentation apparatus be separate from the storage phosphor reader to permit interchange of units and reduce repair times.

In a storage phosphor reader/storage phosphor cassette autoloader system, it is desirable that the cassette be accurately positioned relative to the access opening of the storage phosphor reader so that damage to the cassette and consequently to the storage phosphor is avoided during loading and unloading. Accurate sensing of the position of the cassette is therefore essential. Concomitantly, the position sensor and sensor control should be reliable, maintenance free, inexpensive and relatively simple. Sensor systems which rely on micro switches or CCD arrays can be unreliable, expensive, complex and/or require too frequent maintenance.

There is thus a problem in a storage phosphor reader/storage phosphor cassette autoloader system in providing a cassette position sensor that is reliable, inexpensive, maintenance free and simple.

SUMMARY OF THE INVENTION

According to the present invention, there is provided a solution to the aforesaid problem of the prior art. According to an aspect of the present invention, there is provided, in a storage phosphor system a storage phosphor cassette autoloader for use with a plurality of cassettes, said cassette autoloader comprising:

first and second endless conveyor belts, said conveyor belts being spaced apart and having a plurality of outwardly extending shelves in vertical alignment so as to define a storage phosphor cassette read site and a plurality of cassette retaining sites;

a drive for driving said conveyor belts in unison to transfer cassettes loaded in said retaining sites serially through said read site; and a belt position sensor for sensing the position of at least one of said conveyor belts, said sensor including a source of light and a position sensitive photo diode which is continuously illuminated by said source of light, said source of light and said photo diode being located on opposite sides of the path of said shelves, so that as a shelf moves past said photo diode the light from said light source is progressively blocked and said photo diode generates a signal proportional to the light and dark portions of the photo diode area, said signal having a value representing conveyor belt displacement.

BRIEF DESCRIPTION OF THE DRAWINGS

In the detailed description of the preferred embodiment of the invention presented below, reference is made to the accompanying drawings.

DESCRIPTION OF A PREFERRED EMBODIMENT

Figure 1:
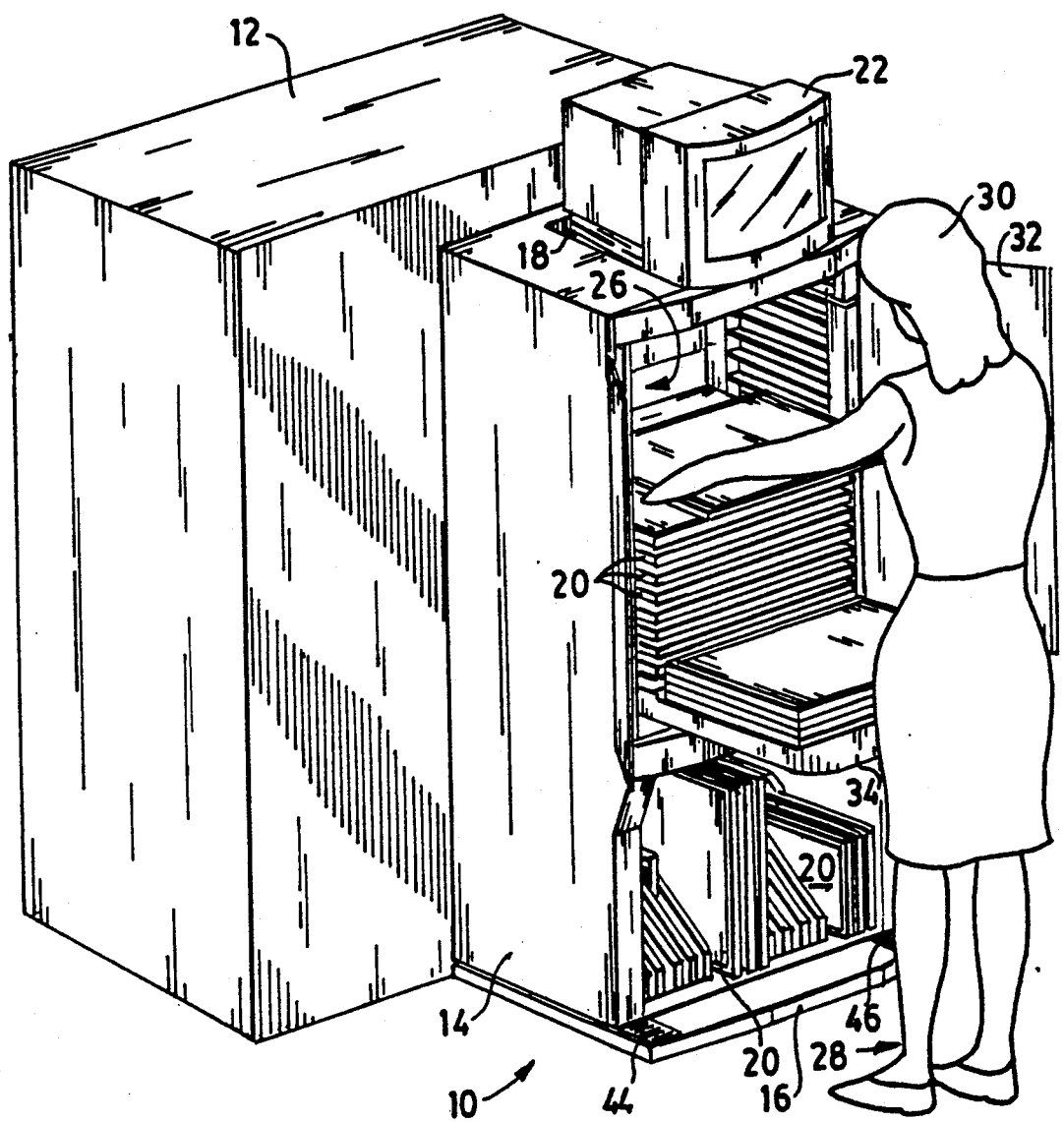
FIG. 1 is a front perspective view of a storage phosphor reader/storage phosphor cassette autoloader system incorporating an embodiment of the present invention.
Figure 2:
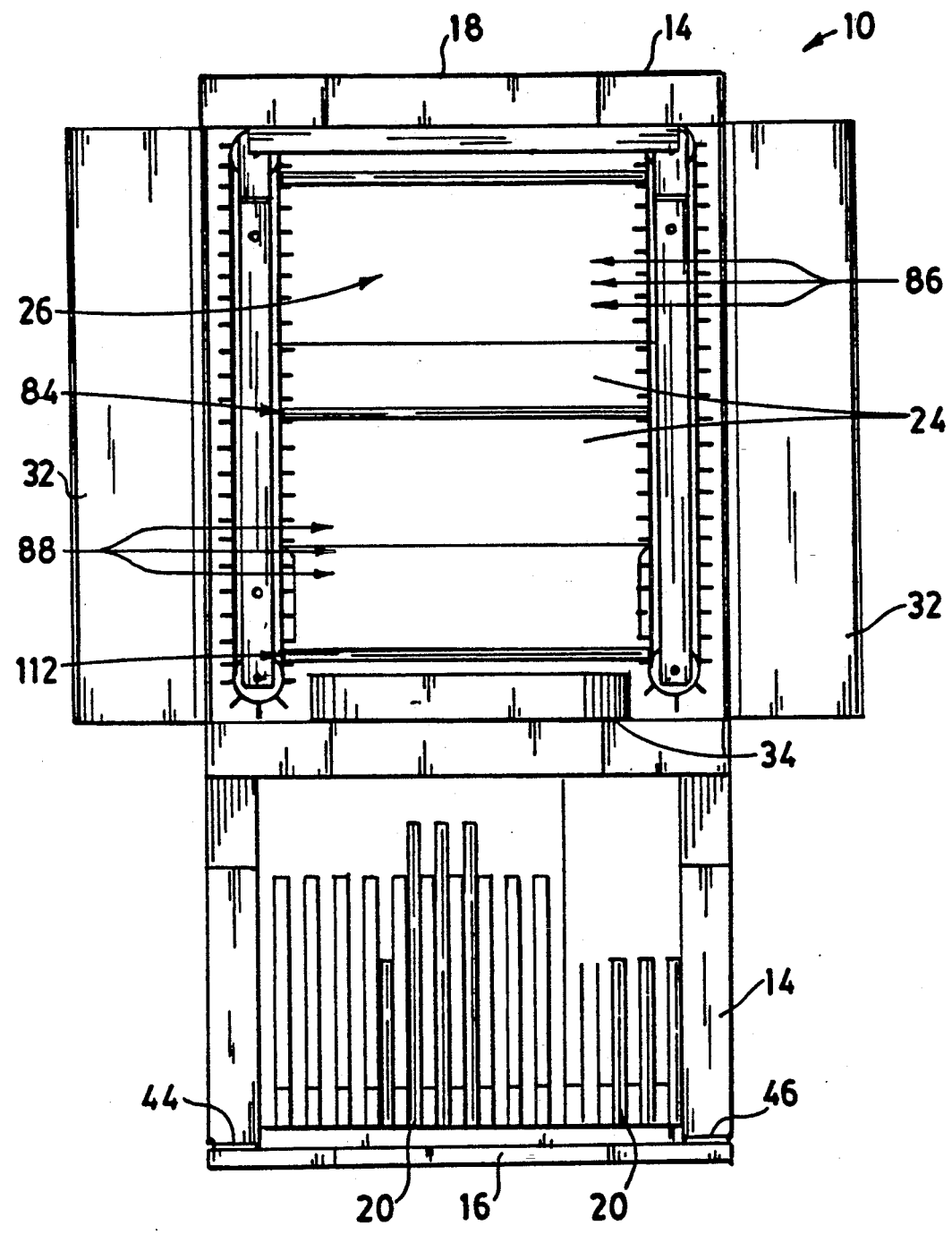
FIG. 2 is a front elevational view of the system of FIG. 1.
Figure 3:
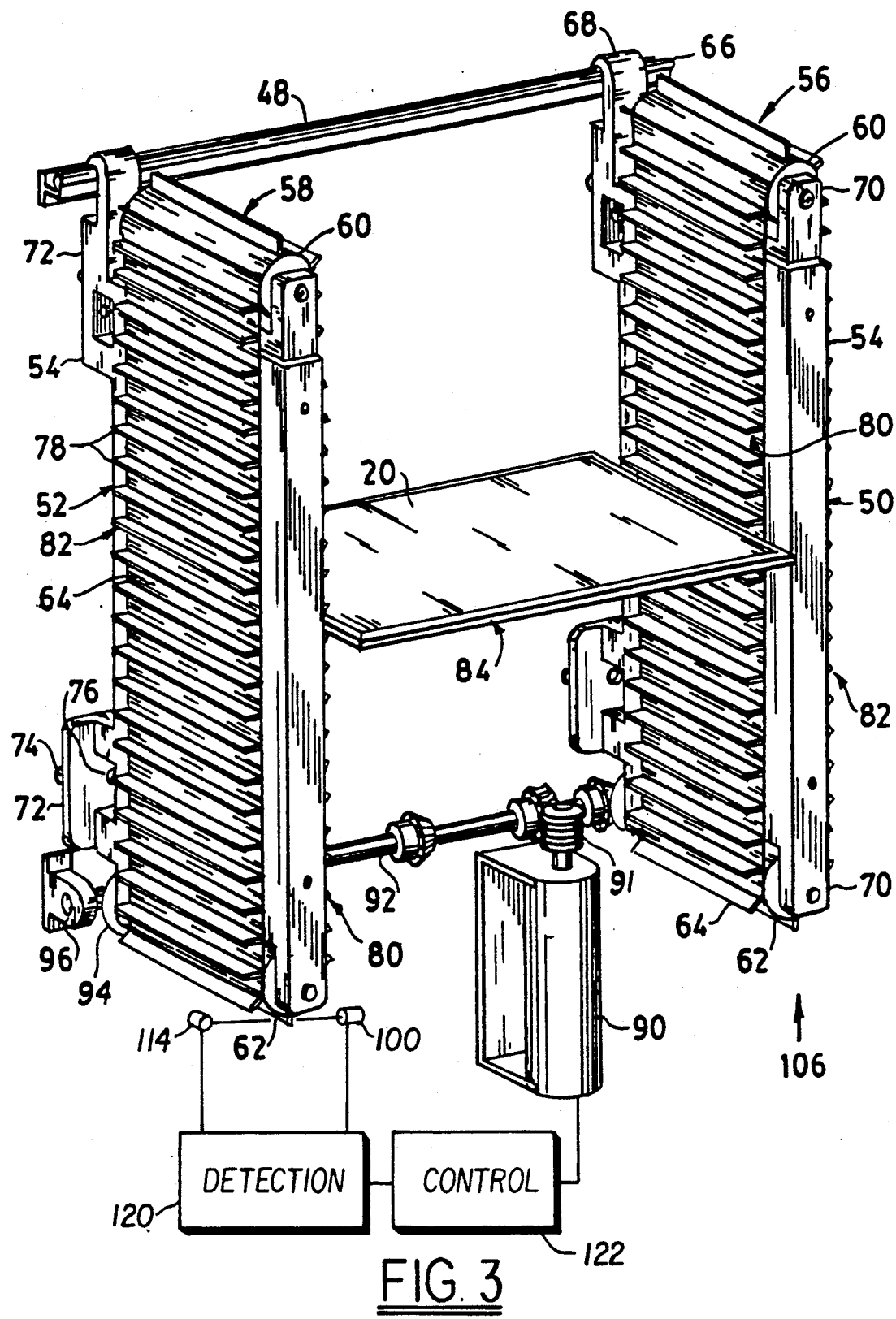
FIG. 3 is a front perspective view of the conveyor system of the autoloader of FIG. 1.

Referring to FIGS. 1, 2 and 3, storage phosphor cassette autoloader 10 is illustrated in a position directly in front of storage phosphor reader 12. Cassette autoloader 10 has a body 14 with a base 16 at the bottom and a monitor station 18 on top. Body 14 can be made of sheet metal or the like reinforced as necessary to support loads imposed by autoloader components and storage phosphor cassettes 20 such as a stimulable phosphor cassette. Monitor station 18 may include some means for preventing inadvertent movement of the monitor 22, such as an indentation. At the rear, body 14 has an access opening 24, through which can be extended an extractor or similar fixture (not shown) of reader 12. At the front, body 14 has a portal 26, which is roughly rectangular in shape and provides access to the interior of body 14. Facing portal 26 is an operator station 28, occupied by the operator 30 in FIG. 1. Doors 32 of body 14 are movable between an open position, shown in FIG. 1, in which the interior of body 14 is accessible and a closed position in which portal 26 is closed. Autoloader 10 includes a cantilevered table 34, which can be moved between a use position, shown in FIG. 1 and a storage position.

Movement of doors 32 and table 34 can be provided by suitable servomotors or the like. Table 34 can be used to hold storage phosphor cassettes 20 during loading and unloading. Alternatively, cassettes 20 can be loaded or unloaded from a cart (not shown). Foot switches 44; 46 (FIG. 1) are provided to permit the operator 30 to either open the doors 32 and extend the table 34 or to only open the doors 32.

Body 14 includes a support bar 48, from which hang first and second conveyor assemblies 50, 52 respectively. Each conveyor assembly 50, 52 has a rack 54 and, mounted on the rack 54, a conveyor 56,58, respectively. First and second conveyors 56, 58 each have an upper wheel, such as cogwheel 60, a lower wheel, such as cogwheel 62, and an endless conveyor belt, such as cogbelt 64, all respectively. In a particular embodiment of the invention, first and second conveyors 56,58, respectively, are interchangeable.

Support bar 48 is a rigid extrusion attached to the back of body 14 near the top by fasteners or the like. Support bar 48 has a protruding flange 66 which receives hook portions 68 of racks 54. Racks 54 are rigid members which have a sheaf portion 70 at each end for respective cogwheels 60,62. At the rear, racks 54 each have a pair of attachment portions 72. Each attachment portion 72 includes one or more positioning pins 74 and a hole 76 for a bolt or other fastener. Racks 54 can be recessed between attachment portions 72 to inset racks 54 from access opening 24.

Cogbelts 64 extend over racks 54 between cogwheels 60,62. Extending outward on cogbelts 64 are regularly spaced shelves 78. Cogbelts 64 can be chains, in which case, cogwheels 60,62 are sprockets, however, it is desirable that cogbelts 64 be timing belts and cogwheels 60,62 be toothed timing belt pulleys. The timing belts are desirable made of a polymeric or reinforced polymeric material. Timing belts present the advantages over chains of generally smaller dimensions, reduced weight and ease in handling, particularly in reference to the repositioning of first conveyor assembly 50, which is discussed below in detail.

Conveyor assemblies 50,52 are each oriented with their longest dimensions vertical. Cogbelts 64 are separated for almost their entire lengths by a distance slightly larger than one of the dimensions of a standard size storage phosphor cassette. Cogbelts 64 have utilization segments 80 that face each other and return segments 82 that face to the outside. Shelves 78 of utilization segments 80 of cogbelts 64 define a sequence of vertically arranged cassette sites 84,86,88 (FIG. 2) within body 14. In line with the center of access opening 24 is a read site 84. A cassette 20 within read site 84 can be accessed by a reader 12. For example, a pair of vertically separated jaws (not shown) could extend from reader 12 and grip cassette 20 allowing an extractor (not shown) to engage and remove a storage phosphor 20. Above read site 84 are a number of loading sites 86, preferably ten or more, into which cassettes 20 may be slid by the operator 30. Cassettes 20 can be interchanged between loading sites 86 easily as needs change, since each cassette 20 is individually supported by a pair of vertically aligned shelves 78 and cassettes 20 are spaced apart from each other by a distance sufficient to permit each individual cassette 20 to be gripped while positioned fully to the back of a respective cassette site 84,86,88. Below read site 84 are a series of unloading sites 88, preferably ten or more, from which cassettes 20 may be unloaded at the convenience of the operator 30 or as needs warrant.

Both conveyors 56,58 are driven in unison by a positive drive 90. Positive drive 90 moves cogbelts 64 by increments equal to the vertical thickness of a cassette site 84,86,88.

In a more preferred embodiment of the invention, illustrated in the Figures, positive drive 90 has geared shaft 91 engaging a geared driveshaft 92, which engage a pair of primary gears 94. Driveshaft 92 is supported at each end by bearing blocks 96. The Figures show primary gears 94 each fixed to the rear end of a lower cogwheel 62 of a respective conveyor 56,58. Primary gears 94 can be positioned in alternate ways, for example, primary gears 94 can be fixed to respective upper cogwheels 60. Primary gears 94 can be made removable for repairs.

Motor 90 is actuated by reader 12 based upon the readiness of reader 12 for cassette 20. Reader 12 sends a signal to a control 122, which actuates conveyors 56,58. Provision of the signal may take a variety of means known to those skilled in the art, for example, reader 12 may direct a light beam at a photodetector wired to stepper motor controller. When actuated, motor 90 drives conveyors 56,58 an increment at a time to shift loaded cassettes 20 downward in steps equal to the separation between cassette sites 84,86,88. Reader 12 accesses each cassette 20 as cassette 20 is presented in read site 84. When a cassette 20 reaches the lowermost unloading site 112 (FIG. 2), a switch (not shown) is actuated by the cassette 20, stopping further movement of conveyors 56,58. The switch can be, for example, a mechanical pressure switch or an optical switch actuated by the interruption of a beam.

FIG. 3 illustrates first conveyor 56 in a first position 106, with a standard size large cassette (for example, 14 inches by 17 inches) (about 35.5 centimeters by 43.2 centimeters) registered in read site 84. Smaller cassettes could be used with first conveyor 56 in this first position 106 by using the smaller cassettes with adapters or pallets (not shown) sized to match a larger size cassette. First conveyor 56 can alternatively be moved to a second position closer to conveyor 58.

In an example of a particular embodiment of the invention, cogbelt 64 is a timing belt of polyurethane having the dimensions: 150 centimeters long, 9.5 inches wide (about 24.1 centimeters), 1 tooth/centimeter. Shelves 78 extend outward 1.5 centimeters and are uniformly spaced apart by a separation of 3 centimeters. In that embodiment there are ten loading sites 86, and ten unloading sites 88. There is cassette storage within body 14 below portal 26 and monitor station 18 is less than five feet (about 1.5 meters) above base 16 of body 14.

In use, the operator 30 brings one or more storage phosphor cassettes 20 to autoloader 10 by hand or on a cart. Operator 30 then opens the doors 32 by actuating foot switch 44 and, at the operator's option extends table 34 by actuating foot switch 46. Operator 30 lifts cassettes 20 with both hands and places them in loading sites 86. The order in which loading sites 86 are loaded is at the option of the operator 30. Table 34 is moved to a storage position, doors 32 are closed and autoloader 10 is prepared to operate. Positioner 10 does not move conveyors 56,58 until a signal is received from reader 12, which causes cassettes 20 to each step downward to the next lower cassette site 84,86,88. When a cassette 20 has been positioned in read site 84, reader 12 acts on that cassette 20, by extracting the storage phosphor from cassette 20 and processing the storage phosphor. The storage phosphor is then returned to cassette 20, cassette 20 is returned to belts 56,58 and autoloader 10 is again signaled to move cassettes 20 downward by an increment. This continues until operator 30 again opens doors 32 and loads or unloads cassettes 20 or until a cassette 20 reaches the lowermost unloading site 112, at which time further movement of conveyors 56,58 is halted.

According to the present invention, there is provided a belt position sensor and detection system that can monitor the position of the conveyor belt 56,58 at about the range where the cassette 20 is ready to be loaded in to the reader 12. This sensor, in the example shown, will have an accuracy of ±0.1 mm and a range of about 3.0 mm. Therefor, the sensor will be able to detect errors that are smaller than ±1.5 mm, measured from the optimum cassette insertion position 84 and with the help of the software it is able to correct that problem with a precision of ±0.1 mm. Also this sensor is can be used to calibrate the conveyor belt 56,58 in the event of a power failure or perhaps at any time that the user feels that it is necessary to readjust and/or calibrate the position of the belts 56,58.

Figure 5:
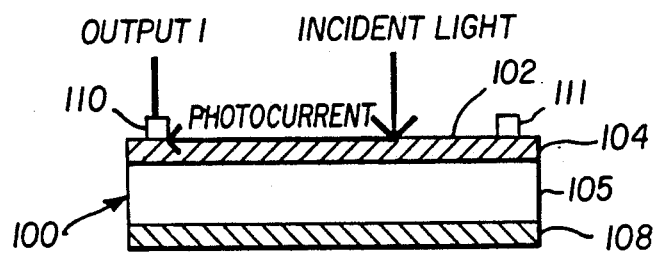
FIG. 5 is a sectional, diagrammatic view of a position sensitive photosensor.

The belt position sensor and detection system is based on a Position Sensitive Detector (PSD) (such as a Hamamatsu S3932-01). As shown in FIG. 5, the silicon PSD consist of monolithic, PIN photodiode sensor 100 with one uniform, resistive surface area 102. Photodiode 100 includes a P-layer 104, an I-layer 105, and N layer 108. When a light spot falls on the PSD 100, an electric charge proportional to the light energy is generated at the incident position. This electric charge is driven through the resistive P-layer 104 and collected by the electrodes 110,111.

Since the resistivity of the P-layer 104 is uniform, the photocurrent collected by an electrode 110,111 is inversely proportional to the distance between the incident position and the electrode.

Figure 4:
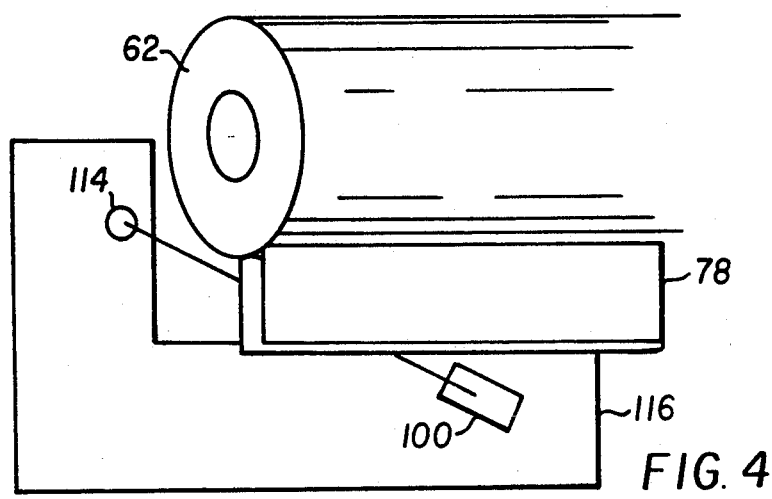
FIG. 4 is a diagrammatic view of the location of the belt position sensor.

As shown in FIG. 4, the detection system includes a source of light (e.g., infrared light), such as LED 114 and PSD sensor 100 mounted on bracket 116 located at the bottom of the belt conveyor system below wheel 62. The position of the vertical shelf 78 that goes around the wheels 62 is detected. Since the distances between, shelves 78 are equal (with a high tolerance), the position of this shelf 78 can be directly correlated to the position of the shelf 78 that is at the cassette 20 insertion position 84.

The sensor 100 is illuminated continuously by an LED 114 and a shadow is created when each of the shelves 78, that are located 31 mm apart on the belt 56,58, move in the path of this illumination. As the shelf 78 travels across the sensor 100, it blocks the light beam from LED 114 and hence generates a shadow on the sensor 100. Hence, the signal collected at the sensor 100 is proportional to the ratio of the light and dark portion of the surface of the sensor 100. This signal is amplified and then directly correlated with the displacement of the shelf 78 and therefor the conveyor belt 56,58. This output is plotted as a function of the belt displacement in FIG. 6.

Figure 6:
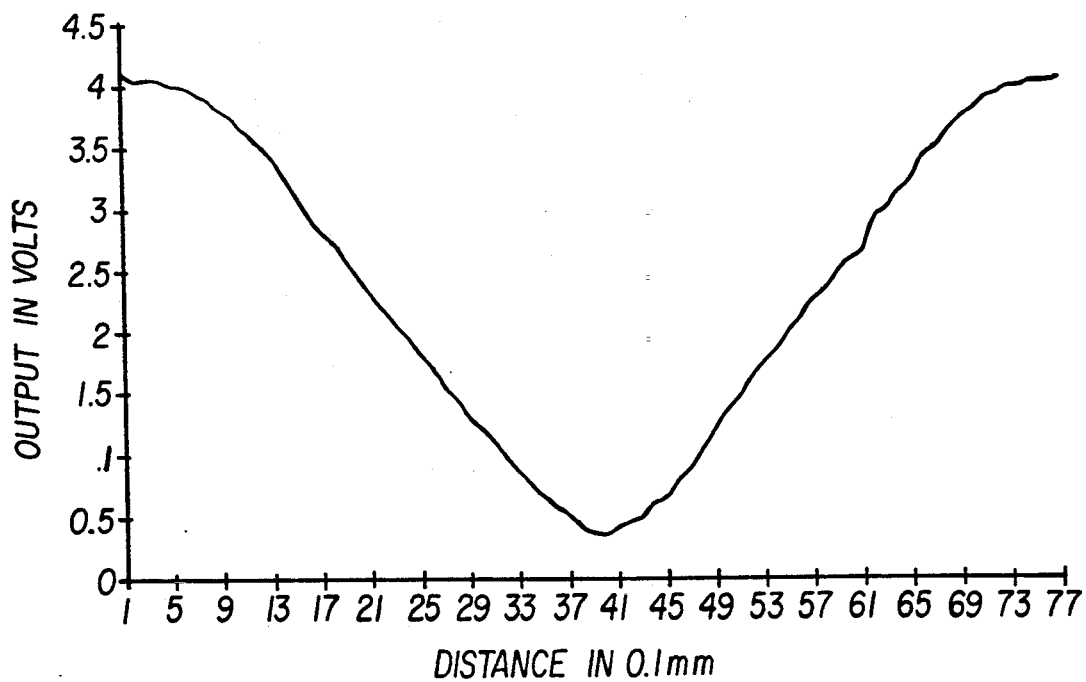
FIG. 6 is a graphical view showing belt position sensor response.

As it can be seen in the graph shown in FIG. 6, there are two slopes where the detector response is linear within a range of about 3.0 mm. If the ideal insertion position of cassette 20 is adjusted to the middle of this range, then any error of up to ±1.5 mm can be detected and corrected. For errors larger than ±1.5 mm, the autoloader 10 has to go through a calibration procedure in which the position of belt 56,58 will be adjusted accordingly. Therefor, even though the active range of the detector 100 is limited to about 3.0 mm, it is capable of correcting for larger errors (30.0 mm) in the belt position.

To study the stability and repeatability of the sensor 100 output, a time study over many hours of operation was conducted. Hence, the autoloader 10 was operated continuously over 8 hours, during which it indexed over 10,000 times. After each index, the output of the belt position sensor 100 was read and recorded. No effective drift in the output over the measured time was observed. This result is very favorable.

Figure 7:
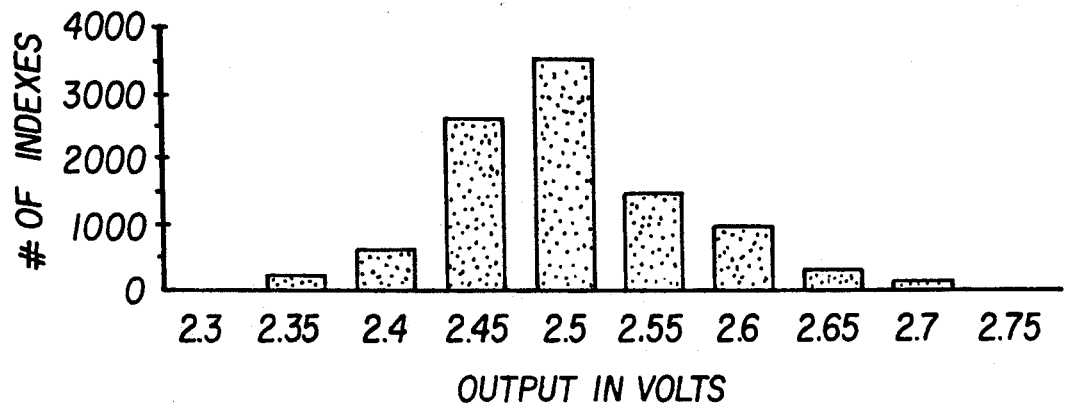
FIG. 7 is a graphical view showing a histogram of 10,000 indexes of the belt position sensor.

To examine the amount of this error quantitatively, a histogram of the 10,000 indexes has been created and shown in FIG. 7. Here it can be seen that the standard deviation is rather small and that only about 1% of the measured values fall beyond the ±0.1 mm range.

It should be noted that the mentioned histogram represents the error of the whole system, which includes any deviations in the shelf-to-shelf distance as well as any electronics drift and noise.

As shown in FIG. 3, a detection circuit 120 supplies a drive signal to LED 114 and receives the belt position detection signal from sensor 100. Control 122 is connected to detection circuit 120 and belt drive 90. Control 122 can be a microprocessor which receives the belt position signal from sensor 100 and supplies correction signals to drive 90 to accurately position belts 56 and 58 so that a cassette 20 is accurately positioned at the access position 84 to storage phosphor reader 12.

Figure 8:
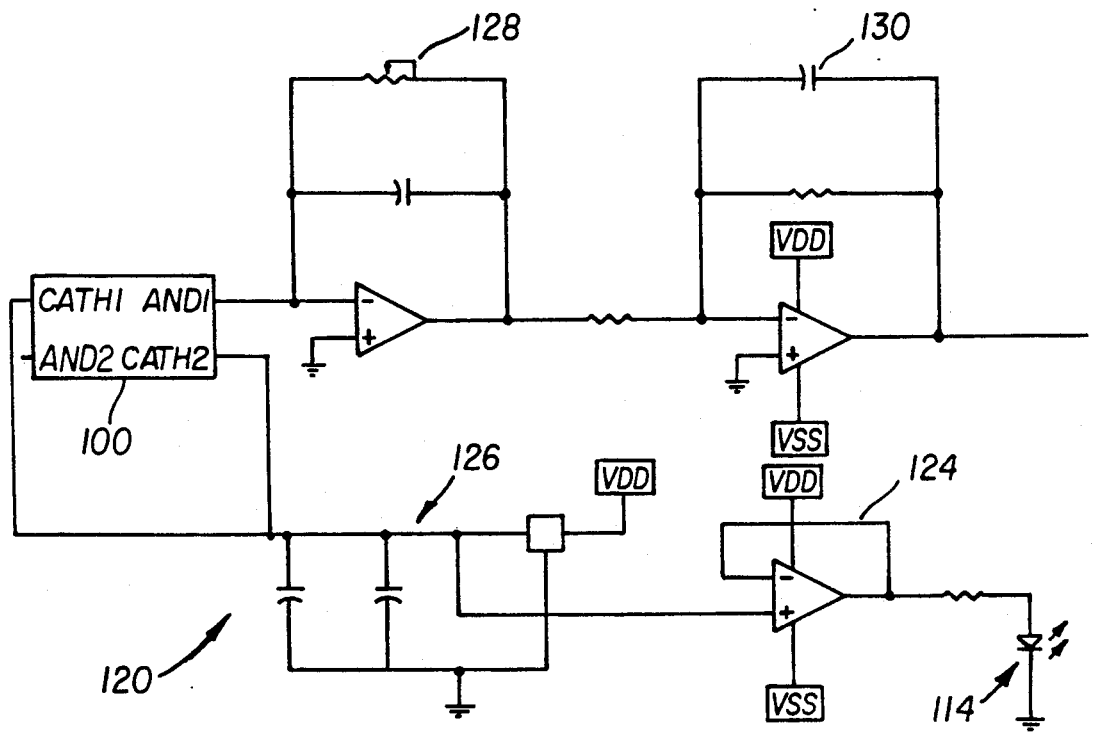
FIG. 8 is an electrical schematic diagram of a sensor control circuit.

Referring now to FIG. 8, there is shown a schematic diagram of detection circuit 120. As shown, LED 114 is driven by driver 124 which receives a 5 volt reference voltage from reference voltage circuit 126. Position sensor detector 100 has cathodes "1" and "3" connected to ground and an anode "4" connected to current-to-voltage operational amplifier 128. The output of amplifier 128 is amplified by operational amplifier 130 whose output is provided to control 122.

Calibration Procedure

The objective of this procedure is to be able to calibrate the belt conveyor system at any time, and particularly at the time of a power failure. This routine will also compensate for any long-term (months) output drift that may occur as a result of the aging in the electronics or the optics.

There are two routines. In the first routine, the belt 56,58 is manually adjusted for the optimum cassette 20 insertion position. Next, a software routine is executed by control 122 that registers the output (A) of the sensor 100, and then it moves the belt slowly until the detector is not blocked by the shelf anymore and maximum output (B) of the sensor 100 is read. It then computes a ratio, $R = B/A$. This number is stored somewhere in the program of control 122. This routine is to be done once in the factory and any time after that, only if the physical and/or mechanical configuration of the belt conveyor system is altered.

The second routine when invoked by control 122 will index the belt 56,58 slowly to move the shelf 78 from the path of the beam and register the maximum sensor output (b). It then divides the stored ratio number (R) by this number and store the result (a), i.e. $a = R/b$. This number (a) will be the new position where the belt will be positioned for the optimum cassette insertion position. This is a simple software routine that may be done once a day as the machine powers up or as often as necessary.

The present invention finds application in storage phosphor reader systems having a multiple cassette autoloader.

Although the invention has been described with reference to preferred embodiments thereof, it will be understood that variations and modifications can be effected within the spirit and scope of the invention as described above and as defined in the appended claims.

What is claimed is:

1. In a storage phosphor system, a storage phosphor cassette autoloader for use with a plurality of cassettes comprising:

first and second endless conveyor belts, said first and second conveyor belts being spaced apart and having a plurality of outwardly extending shelves in vertical alignment so as to define a storage phosphor cassette read site and a plurality of storage phosphor cassette retaining sites;

a drive for driving said first and second conveyor belts in unison to transfer cassettes loaded in said retaining sites through said read site; and a belt position detector for detecting the position of at least one of said first and second conveyor belts, said detector including a source of light and a position sensitive photodiode sensor which is continuously illuminated by said source of light, said source of light and said photodiode sensor being located on opposite sides of the path of said shelves, so that as a shelf moves past said photodiode sensor the light from said light source is progressively blocked and said photodiode sensor generates a signal proportional to the light and dark portions of a photodiode area, said signal having a value representing conveyor belt displacement.

2. The autoloader of claim 1 wherein said first and second conveying belts are disposed vertically and said detector is located at the bottom of said at least one of said first and second conveyor belts.

3. The autoloader of claim 1 including a detection circuit having a current-to-voltage amplifier for converting a current signal from said photodiode sensor into a voltage signal and an amplifier for amplifying said voltage signal.

4. The autoloader of claim 4 wherein said detection circuit includes a driver for driving said LED.

* * * * *